Nov. 12, 1963 P. M. SCHUFTAN 3,110,155
IMPROVED PROCESS FOR THE SEPARATION OF AIR TO
PRODUCE A DESIRED SEPARATION PRODUCT
IN THE GASEOUS PHASE UNDER PRESSURE
Filed April 4, 1961
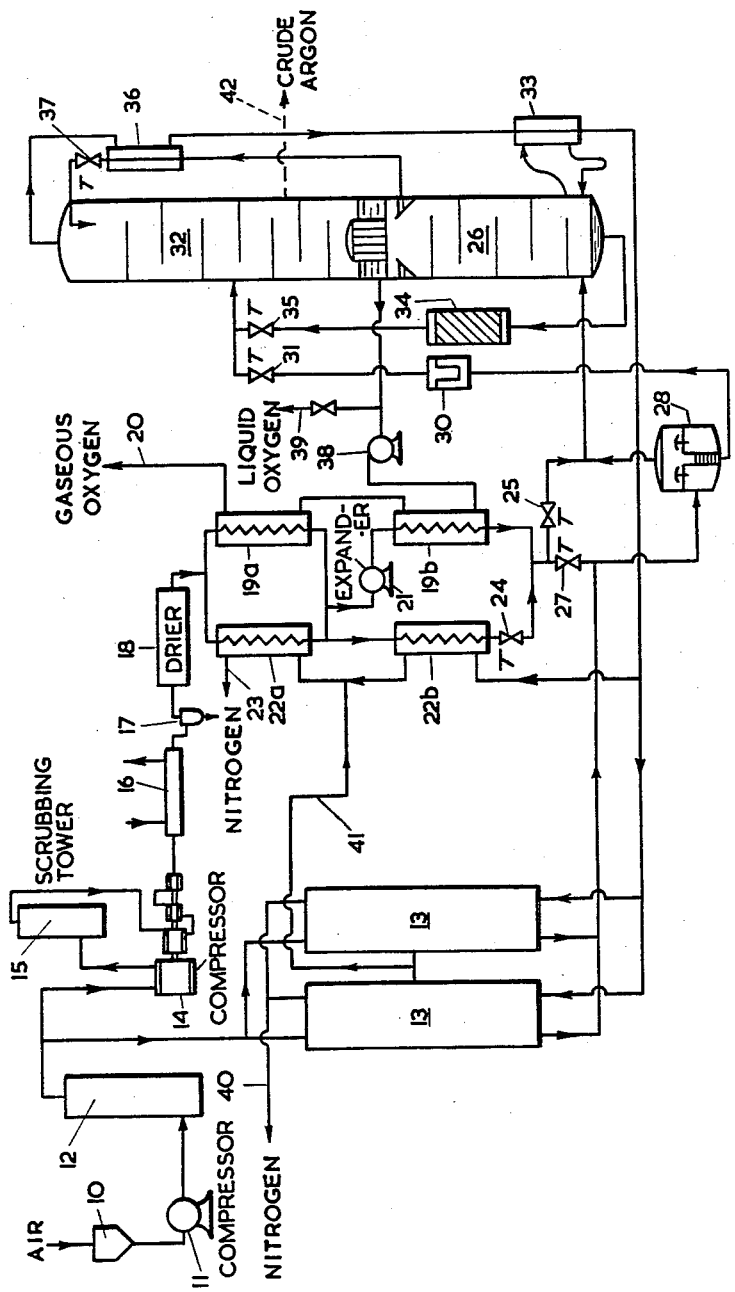
INVENTOR
PAUL MAURICE SCHUFTAN
BY
ATTORNEY 3,110,155
IMPROVED PROCESS FOR THE SEPARATION OF AIR TO PRODUCE A DESIRED SEPARATION PRODUCT IN THE GASEOUS PHASE UNDER PRESSURE
Paul Maurice Schuftan, Richmond, Surrey, England, assignor to The British Oxygen Company Limited, a British company
Filed Apr. 4, 1961, Ser. No. 100,607
Claims priority, application Great Britain Apr. 11, 1960
3 Claims. (Cl. 62—30)

This invention relates to the low temperature separation of air and more particularly to processes in which a desired separation product is produced in the gaseous state under pressure by separating air at low temperature by rectification, withdrawing the desired separation product as liquid, pumping the liquid to the required final pressure, and thereafter vaporizing the compressed liquid and warming it to near ambient temperature by heat exchange with a suitable fluid heating medium which may be an air feed to the plant, or a separated nitrogen or argon fraction at a suitable pressure.

In general, the enthalpy/temperature curves of the liquid separation product to be vaporized under pressure and the heating medium will have a very different shape, resulting in unwanted large temperature differences in one part of the heat exchanger and unduly small temperature differences at other parts of the exchanger. The thermo-dynamic efficiency of such a process is relatively low and in addition large heat exchange surfaces may therefore be required.

In order to cover the cold requirements of the process either the whole of the incoming air or an ancillary gas (usually nitrogen) has to be compressed to a high pressure or a part of the air has to be expanded from a high pressure to the rectification pressure in a reciprocating expansion engine. Separation plants employing processes of this type have a relatively high power consumption or are expensive to manufacture.

One method of obtaining a closer correspondence between the enthalpy/temperature curves of the desired separation product and the heating medium with more uniform temperature differences, and at the same time covering the cold requirements of the separation plant more efficiently, is to make use of two heat exchangers in series for vaporizing and warming the compressed liquid separation product, these exchangers being heated by incoming air at constant pressure, the air being cooled by an external refrigerating system after leaving the first exchanger and before entering the second one.

While in this case satisfactory temperature differences between the separation product and the heating air can be achieved, the use of an external refrigerating system which has to work at relatively low temperatures and which has to include the necessary accessories, such as a condenser and an evaporator, is costly, cumbersome and relatively inefficient. In addition, the refrigerant used in the auxiliary circuit is not always readily available and can be expensive.

It is an object of the present invention to avoid the disadvantages attendant on the use of an external refrigerating cycle whilst still ensuring satisfactory temperature differences between the separation product and the heating air.

According to the invention, in an air separation process in which a desired separating product is produced in the gaseous phase under pressure by separating air at low temperature, withdrawing the desired separation product as liquid, pumping the liquid by counter-current heat exchange with a gaseous heating medium compressed to a pressure higher than the rectification pressure, the heat exchange is effected in two stages and the heating medium is cooled by isentropic expansion to a pressure intermediate its initial pressure and the rectification pressure between the two stages. The heating of the desired separation product is thus carried out using a gas at two different pressures and external refrigeration in avoided, whilst the cold requirements of the plant are covered in a simple and economical way. The two heat exchange stages are effected in two heat exchangers arranged in series.

The term "isentropic expansion" as used herein is intended to mean expansion with the performance of external work in a suitable expander. Since all such expanders have a limited efficiency, it will be appreciated that the expansion will not in fact be completely isentropic.

The present invention is particularly applicable to large separation plants where the major part of the air is only compressed to the rectification pressure and cooled in regenerators or reversing exchangers (hereinafter referred to generically as "switch exchangers") by the bulk of the separated nitrogen fraction, while the minor portion of the air or another gas is compressed to a higher pressure and used for heat exchange with a compressed liquid oxygen fraction and with a small secondary nitrogen fraction.

Preferably, the heating of this small secondary nitrogen fraction by the high pressure gas is also carried out in two heat exchangers arranged in series, the exchangers being designed so as to keep the temperature of the high pressure gas leaving the first heat exchanger about equal to that of the parallel high pressure gas stream leaving the first oxygen exchanger. Part of the high pressure gas leaving the first nitrogen exchanger can then be diverted and admixed with the parallel high pressure gas stream leaving the first oxygen exchanger, the combined stream being passed to the expander. In this way, the cold production and the thermodynamic efficiency of the cycle may be increased.

It had been found that when operating in accordance with the invention, the pressure ratio in the expander for the high pressure gas is relatively low and well within the range of a turbine, which means that the bulky reciprocating expansion engines required in alternative processes can be dispensed with.

The pressure level and the amount of the gas required for vaporizing and warming the liquid oxygen fraction depend on the pressure at which the gaseous oxygen is to be produced and whether or not a part of the oxygen is required as liquid. As an example, for the production of gaseous oxygen at 10 atma., on a large scale plant about 70% of the air is compressed to the rectification pressure only and is passed through regenerators or reversing exchangers in heat exchange with the bulk of the separated nitrogen fraction, while the remaining 30% of the air is further compressed to about 60 atma. A major part of this high pressure air is used for heat exchange with the compressed liquid oxygen in two stages whilst a minor part is used for heat exchange with a small secondary nitrogen fraction also in two stages. Part of the air leaving the first nitrogen exchanger is diverted into the high pressure air leaving the first oxygen exchanger and the combined stream is then isentropically expanded to about 30 atma. and then enters the second oxygen exchanger to complete the heat exchange with the liquid oxygen.

Similarly, to produce a gaseous oxygen fraction at a pressure of 40 atma., about 35% of the air is required at an initial pressure of 110–120 atma. with intermediate expansion to about 75–80 atma.

While for the sake of clarity the invention has been described with particular reference to the production of a gaseous oxygen fraction under pressure, it can equally well be applied to the production of a gaseous nitrogen fraction at a pressure exceeding the rectification pressure, liquid nitrogen being withdrawn from the rectification system, compressed by a pump and vaporised and warmed in a two-stage heat exchange system.

In order to achieve small warm end temperature differences in the switch exchangers used for cooling the major part of the incoming air while still ensuring complete re-sublimation of carbon dioxide and moisture, a small amount of nitrogen may be withdrawn as a side-bleed from the switch exchangers at a temperature near that of the secondary nitrogen fraction between the two nitrogen heat exchange stages and warmed by the requisite amount of high pressure gas. In this way, a slight reduction of the power consumption is possible if the two nitrogen fractions (i.e. that constituting the side-bleed from the switch exchangers and the secondary nitrogen fraction passing through the two-stage nitrogen heat exchange system) are of different purity, the warming of the side-bleed may be carried out in a separate exchanger parallel to the first nitrogen exchanger. If the two nitrogen fractions have the same purity, the side-bleed from the switch exchangers can be mixed with the secondary nitrogen fraction between the two heat exchange stages. In this case, no additional heat exchanger is required.

It has been found that when operating in accordance with the invention, pressure and temperature levels can be so adjusted as to make it possible to dispense with the chemical removal of the carbon dioxide from the high pressure air stream not passing through the regenerators or reversing exchangers. For this purpose, the carbon dioxide may be removed from the major part of the high pressure air stream by alternately-operating adsorbers located in the exhaust of the expander, while the carbon dioxide contained in the small part of the high pressure air passing through the second nitrogen exchanger can be removed by cooling and precipitation.

The invention will now be more particularly described with reference to the accompanying drawings which illustrates diagrammatically one arrangement of apparatus for practicing the process of this invention.

It will be understood that the drawing illustrates diagrammatically preferred apparatus for practicing this invention and that the invention may be carried out using other apparatus. For example, the reversing heat exchange zone has been shown as constituted by regenerators but it might equally be constituted by reversing heat exchangers.

For the sake of clarity and to avoid undue elaboration of the description, the change-over valve system associated with the regenerators has not been shown in the drawing, but it will be appreciated that such a system must be provided.

The drawing will be described with reference to the production of 95% oxygen, by way of example, but it will be appreciated that the apparatus may be used for the production of higher or lower oxygen purities.

Referring to the drawing, air enters the separation system through a filter 10 and passes into an electrically driven multi-stage turbo-compressor 11 which delivers the air at a pressure of 67 p.s.i.g. The compressed air is then cooled in a cooler 12 by direct contact with cooling water to approximately the temperature of the cooling water. The air leaving the cooler 12 is divided into a major stream and a minor stream, the relative proportions of the two streams being dependent on the pressure at which the gaseous oxygen product is required and on the proportion of the oxygen product to be withdrawn as liquid.

The major air stream is cooled approximately to its dew point by passage through one of two regenerators 13 of conventional type, the regenerator not in use for cooling air being itself re-cooled by passage therethrough of a cold gaseous nitrogen fraction as hereinafter described. The regenerators 13 are changed over after a suitable period. During the passage of the major air stream through the regenerator, carbon dioxide, water vapour and other contaminants present in the air are deposited on the regenerator packing, from which they are volatilized during the cooling cycle by the returning nitrogen stream. Balancing of the regenerators is achieved by insuring that the mass flow of the nitrogen product passing through the regenerators is greater than that of the major air stream. The cooled major air stream is then fed to the rectification system as hereinafter described.

The minor air stream is further compressed in a piston compressor 14 to a pressure which will again depend upon the pressure of the gaseous oxygen product and the proportion of the total oxygen product required to be withdrawn as liquid. Thus when all the oxygen is required as gas at 40 atma., the pressure used may be 110–120 atma. while if 10% of the oxygen is required as liquid, the pressure will need to be raised to 160–165 atma.

At a convenient point, for example, as shown in the drawing between the first and second stages of the compressor, the air is passed through a scrubbing tower 15 in which its carbon dioxide is removed by caustic soda solution.

The high pressure minor air stream is then cooled to about 12° C. in a cooler 16 by heat exchange with an external refrigerant, such as, for example, boiling dichlorodifluoromethane. Water condensed from the air on cooling is removed in a separator 17. The remainder of the moisture in the minor air stream is then removed by passage through a drier 18 containing a suitable adsorbent such as alumina. While for the sake of simplicity, only one such drier is shown in the drawing, in practice the drier is provided in duplicate for alternate use, one drier being reactivated while the other is in use. Again, it will be appreciated that in accordance with conventional practice, an oil filter is inserted before the drier to remove any traces of oil in the air, and a dust filter after the drier to remove any alumina dust carried over by the air stream from the drier.

The minor air stream is then divided into a first and a second sub-stream, the relative proportions of the sub-streams again depending on the required oxygen pressure and on the proportion of the total oxygen product required as liquid. Thus, in the example referred to above, where all the oxygen is required as gas at 40 atma., the first sub-stream may comprise about 66% of the high pressure air, while if 10% of the oxygen product is required as liquid, the first sub-stream may comprise about 70% of the high pressure air.

The first sub-stream is cooled in a pair of heat exchangers, 19a and 19b, arranged in series by heat exchange with a pressurized liquid oxygen fraction which is itself vaporized. The compressed gaseous oxygen fraction so produced is withdrawn as product at 20.

Between the first heat exchanger 19a and the second 19b, the first sub-stream is passed through an expansion machine 21 where it is expanded to a pressure intermediate its initial high pressure and the rectification pressure with the production of external work.

The second sub-stream is cooled by heat exchange with a gaseous nitrogen fraction through two heat-exchangers, 22a and 22b arranged in series. After leaving the exchanger 22a, the nitrogen fraction is withdrawn at 23 as a dry gaseous nitrogen product uncontaminated with carbon dioxide or moisture.

A part of the second sub-stream leaving the first exchanger 22a is admixed with the first sub-stream leaving the exchanger 19a and with it is subjected to expansion in the machine 21.

The remainder of the second sub-stream leaving the exchanger 22b is expanded to the intermediate pressure through a valve 24 and mixed with the first sub-stream leaving the exchanger 19b.

The bulk of the combined streams is then expanded through a valve 25, and fed to the lower column 26 of a conventional double column rectification system. The column 26 operates at about 64 p.s.i.g. A small proportion (for example, about 4%) of the combined first and second sub-streams is bled off upstream the valve 25 and expanded with consequent liquefaction through a valve 27 into the major air stream leaving the regenerators 13.

The major air stream is then fed to an equalizer 28. In the drawings, the equalizer 28 is shown as located apart from the rectification columns, but if desired, it may be located at the bottom of the lower column 26. In the equalizer 28, efficient contact between the vapour and the liquid is obtained and residual higher boiling impurities, such as carbon dioxide, are dissolved or precipitated. Vapour from the equalizer 28 is fed into the lower column 26 while the small liquid residue containing the higher boiling impurities is withdrawn from the bottom of the equalizer 28, passed through a filter and/or adsorber 30 and expanded through a valve 31 into the upper column 32 of the rectification system. This upper column 32 operates at substantially atmospheric pressure. A portion of the air fed to the column 26 is withdrawn, liquefied in a condenser 33 by heat exchange with a gaseous nitrogen fraction leaving the rectification system and returned to the column 26. The amount of air so withdrawn and liquefied is adjusted so that the temperature of the gaseous nitrogen fraction leaving the condenser 33 is about —175° C.

In the column 26, the air is separated into an oxygen-enriched liquid fraction collecting at the bottom of the column and a liquid nitrogen fraction which is formed at the top of the column. The oxygen-enriched liquid is withdrawn from the column 26 and passed through an adsorber 34 in which hydrocarbons or other contaminants are removed by a suitable adsorbent such as silica gel. While for simplicity only one adsorber 34 is shown in the drawing, in practice the adsorber is provided in duplicate so that one can be regenerated while the other is on stream. From the adsorber 34, the oxygen-enriched liquid is expanded through an expansion valve 35 into the upper column 32 of the rectification system.

The liquid nitrogen fraction formed at the top of the lower column 26 is used as reflux liquid in both columns, a part of the liquid nitrogen being withdrawn, cooled in a heat exchanger 36 against gaseous nitrogen leaving the upper column 32, and expanded through an expansion valve 37 into the top of the upper column 32.

In the upper column 32, the air is further separated into a liquid oxygen fraction collecting at the bottom of the upper column and a gaseous nitrogen fraction withdrawn from the top of the column. The liquid oxygen product is withdrawn from the bottom of the upper column and fed to a pump 38 where it is pumped to the required pressure. The pressurised liquid oxygen fraction is then passed to the heat exchangers 19a and 19b where it is vaporised and heated by high-pressure air as previously described.

If required, a part of the liquid oxygen fraction may be withdrawn through a valve-controlled outlet 39 upstream the pump 38 and stored or used as liquid. Such stored liquid may, for example, be used to produce compressed gaseous oxygen during periods when the separation plant is shut down.

The gaseous nitrogen fraction is withdrawn from the top of the upper column and passed successively through the exchanger 36 and the condenser 33 as hereinbefore described. After leaving the condenser, the gaseous nitrogen fraction is divided into two streams, one stream passing through the regenerators 13 and being withdrawn at 40 as waste nitrogen contaminated with water vapour and carbon dioxide. The other stream passes successively through the exchangers 22b and 22a and is withdrawn at 22 as a dry gaseous nitrogen product uncontaminated with carbon dioxide as previously described. If desired, this second nitrogen stream may be obtained at higher purity by withdrawing it from the top of an extension of column 32. In this case an extra passage has to be provided both in exchangers 36 and 33.

Substantially complete volatilisation of condensed deposits in the regenerator 13 through which the nitrogen stream is passing is ensured by arranging that the mass flow of this stream is somewhat greater than that of the major air stream passing through the regenerators.

If desired, and in order to achieve small warm end temperature differences in the regenerators 13, a small amount of nitrogen may be withdrawn, as shown by dotted lines in the drawing, from the regenerators 13 at a temperature near that of the nitrogen fraction leaving the exchanger 22b and admixed with this nitrogen fraction at a point between the exchangers 22b and 22a through a line 41.

When the process of the instant invention is used for the production of oxygen of high purity, it may be desirable to withdraw an argon-containing fraction from the upper column 32 (as indicated in the drawing at 42) and to recover the argon therefrom by conventional means.

I claim:
1. A process for the separation of air to produce oxygen in the gaseous phase under pressure comprising the steps of
    (1) separating the air at low temperature in a rectification zone,
    (2) withdrawing the oxygen as a liquid from the rectification zone,
    (3) increasing the pressure on said withdrawn liquid oxygen,
    (4) vaporizing the compressed liquid by countercurrent heat exchange in a two stage heat exchange step with a gaseous heating medium comprising a portion of the air to be separated in the first step which air has been compressed to a pressure higher than rectification pressure,
    (5) a part of said gaseous heating medium being used to warm a part of a separated nitrogen fraction withdrawn from said rectification zone by two-stage heat exchange,
    (6) said part of said heating medium used for this purpose being admixed with the gaseous heating medium leaving the first stage of the liquid oxygen vaporization step,
    (7) said admixed gaseous heating medium expanded isentropically to a pressure intermediate its initial pressure and the rectification pressure,
    (8) said air to be separated being cooled in switch exchangers by heat exchange with a part of the separated nitrogen fraction while
    (9) the remainder of the air is further compressed to provide the gaseous heating medium.

2. Process according to claim 1 wherein a small amount of nitrogen is withdrawn as a side-bleed from the switch exchangers at a temperature near that of the part of the separated nitrogen fraction warmed by the gaseous heating medium between the two heat exchange stages and said side-bleed is warmed by said gaseous heating medium.

3. Process according to claim 1 wherein said side-bleed is added to said part of the separated nitrogen fraction warmed by the gaseous heating medium between the two heat exchange stages.

References Cited in the file of this patent

UNITED STATES PATENTS

| | | |
|---|---|---|
| Re. 19,267 | Van Nuys | Aug. 7, 1934 |
| 2,116,191 | De Baufre | May 3, 1938 |
| 2,355,660 | Le Rouge | Aug. 15, 1944 |
| 2,582,148 | Nelly | Jan. 8, 1952 |
| 2,712,738 | Wucherer | July 12, 1955 |
| 2,822,675 | Grenier | Feb. 11, 1958 |
| 2,918,802 | Grunberg | Dec. 29, 1959 |
| 2,940,270 | Palazzo | June 14, 1960 |

FOREIGN PATENTS

| | | |
|---|---|---|
| 861,540 | Great Britain | Nov. 13, 1959 |
| 952,908 | Germany | Nov. 22, 1956 |
| 1,158,639 | France | June 27, 1958 |